(12) United States Patent
Zhao et al.

(10) Patent No.: US 8,802,746 B2
(45) Date of Patent: Aug. 12, 2014

(54) ISOCYANATE-BASED FOAM HAVING IMPROVED ANTI-YELLOWING PROPERTIES AND PROCESS FOR PRODUCTION THEREOF

(75) Inventors: Wen Wei Zhao, Etobicoke (CA); Mladen Vidakovic, Duisburg (DE); Eugene Smeianu, Thornhill (CA)

(73) Assignee: Proprietect L.P. (CA)

( * ) Notice: Subject to any disclaimer, the term of this patent is extended or adjusted under 35 U.S.C. 154(b) by 0 days.

(21) Appl. No.: 13/149,102

(22) Filed: May 31, 2011

(65) Prior Publication Data

US 2011/0230577 A1 Sep. 22, 2011

Related U.S. Application Data

(63) Continuation of application No. 11/745,920, filed on May 8, 2007, now abandoned, which is a continuation of application No. 10/783,023, filed on Feb. 23, 2004, now abandoned.

(60) Provisional application No. 60/448,476, filed on Feb. 21, 2003.

(51) Int. Cl.
*C08G 18/28* (2006.01)

(52) U.S. Cl.
USPC ........... 521/168; 521/107; 521/130; 521/169; 521/170; 521/174

(58) Field of Classification Search
USPC .................. 521/107, 174, 130, 168, 169, 170
See application file for complete search history.

(56) References Cited

U.S. PATENT DOCUMENTS

| | | | | | |
|---|---|---|---|---|---|
| 3,989,652 | A | * | 11/1976 | Shim | 521/169 |
| 4,135,042 | A | * | 1/1979 | Lickei et al. | 521/107 |
| 4,594,364 | A | * | 6/1986 | Pawloski et al. | 521/85 |
| 5,173,515 | A | * | 12/1992 | von Bonin et al. | 521/103 |
| 5,556,894 | A | * | 9/1996 | Fishback et al. | 521/168 |
| 5,728,746 | A | * | 3/1998 | Sicken | 521/169 |
| 5,981,612 | A | * | 11/1999 | Keppeler et al. | 521/107 |
| 6,107,507 | A | * | 8/2000 | Stowell | 558/113 |
| 6,262,135 | B1 | * | 7/2001 | Bradford et al. | 521/107 |
| 6,372,811 | B2 | * | 4/2002 | Singh et al. | 521/131 |
| 6,380,273 | B1 | * | 4/2002 | Eilbracht et al. | 521/108 |
| 7,288,577 | B1 | * | 10/2007 | Bradford et al. | 521/107 |
| 7,671,105 | B2 | * | 3/2010 | Krupa et al. | 521/131 |
| 2002/0013379 | A1 | * | 1/2002 | Singh et al. | 521/174 |
| 2004/0077741 | A1 | * | 4/2004 | Knop et al. | 521/155 |

* cited by examiner

*Primary Examiner* — John Cooney
(74) *Attorney, Agent, or Firm* — Katten Muchin Rosenman LLP

(57) ABSTRACT

There is described an isocyanate-based polymer foam having improved anti-yellowing properties. The foam produced from a formulation comprising an isocyanate, a blowing agent, a first active hydrogen-containing compound and a second active hydrogen-containing compound different than the first active hydrogen-containing compound. The second active hydrogen-containing compound comprises an active hydrogen-containing phosphite compound. A process for producing such a foam is also described.

29 Claims, 2 Drawing Sheets

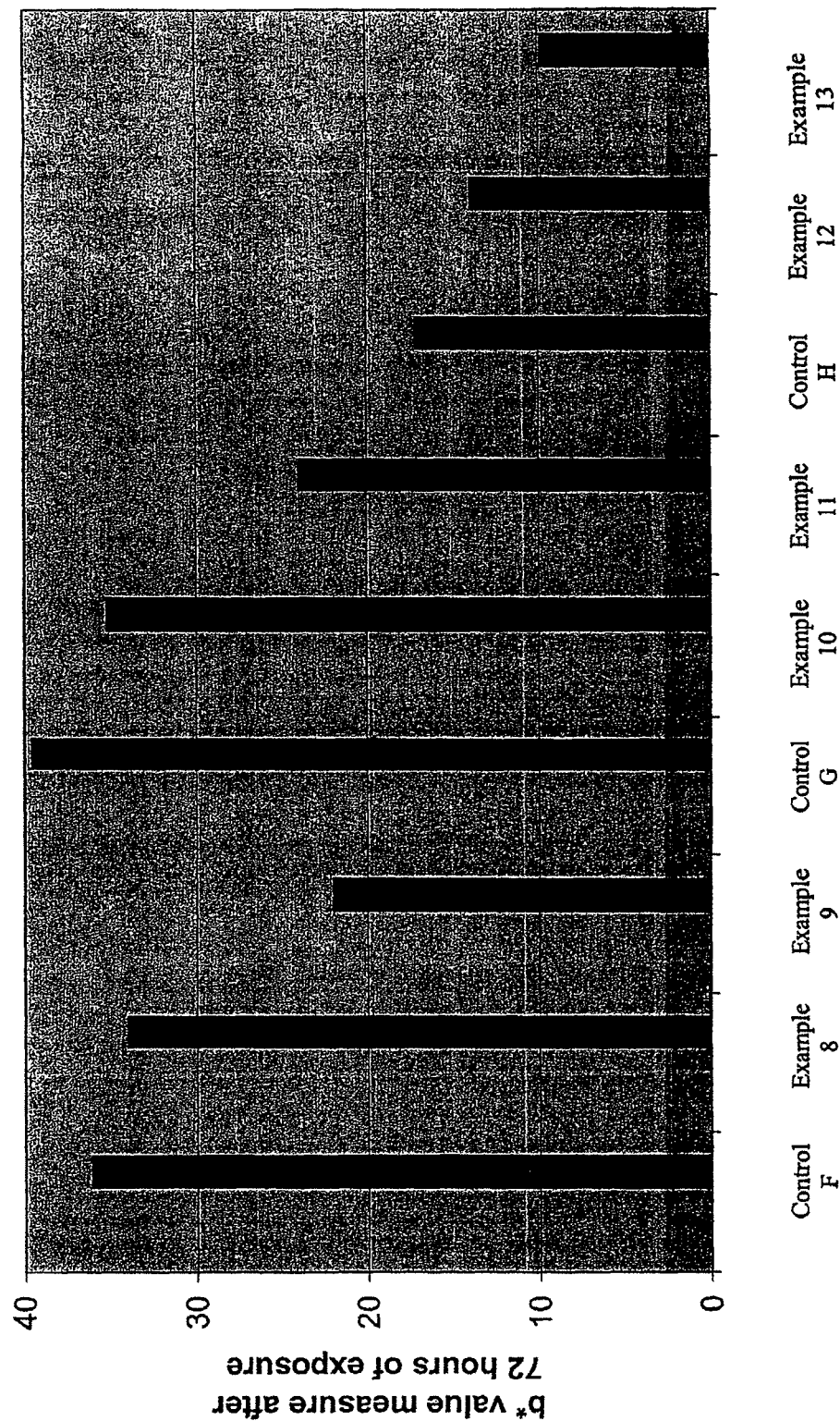

ISOCYANATE-BASED FOAM HAVING IMPROVED ANTI-YELLOWING PROPERTIES AND PROCESS FOR PRODUCTION THEREOF

CROSS-REFERENCE TO RELATED APPLICATION

The present application is a continuation of U.S. patent application Ser. No. 11/745,920, filed May 8, 2007, (now abandoned) which is a continuation of U.S. patent application Ser. No. 10/783,023, filed Feb. 23, 2004 (now abandoned), which claims the benefit under 35 U.S.C. §119(e) of provisional patent application Ser. No. 60/448,476, filed Feb. 21, 2003, the contents of all incorporated herein by reference.

BACKGROUND OF THE INVENTION

1. Field of the Invention

In one of its aspects, the present invention relates to an isocyanate-based polymer foam and to a process for production thereof. More particularly, the present invention relates to an isocyanate-based polymer foam, inter alia, having improved anti-yellowing properties compared to prior art foams. In another of its aspects, the present invention relates to a process for producing such an isocyanate-based polymer foam.

2. Description of the Prior Art

Isocyanate-based foams, such as polyurethane foams, are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, one of the characteristics of isocyanate-based foams, particularly polyurethane foams produced from formulations containing aromatic isocyanates (e.g., TDI, MDI and mixtures thereof), is their tendency to change colour after production. Specifically, polyurethane foams are known to change colour from slightly off-white directly after production to mustard yellow within hours or days after production.

The colour change usually occurs on the surface of the foam within a relatively thin layer as a result of exposure to light (fluorescent or non-fluorescent) and atmosphere. This type of environmental induced colour change is different from scorching discoloration resulting from thermal induced degradation and does not have any significant impact on the physical properties of the foam. Nevertheless, the colour is unwelcome by most customers.

It is known in the prior art that isocyanate-based foams produced from formulations containing aliphatic and/or alicyclic-based isocyanates are less susceptible to environmentally induced discoloration when compared to isocyanate-based foams produced from formulations containing aromatic-based isocyanates. See for example any one of the following: Japanese patent application S52-52997/1977, Japanese patent application H02-255817/1990, Japanese patent application H04-318016/1992 and U.S. Pat. No. 4,542,166 for teachings of yellowing-resistant isocyanate-based foams produced from formulations containing aliphatic and/or alicyclic-based isocyanates. Unfortunately, isocyanate-based foams produced from formulations containing aliphatic and/or alicyclic-based isocyanates have been met with very limited commercial success as a result of relatively poor physical properties such as melting upon exposure to ultra-violet radiation, relatively low heat resistance, relatively high material costs (i.e., of the isocyanates) and the like.

To date the prior art has not developed a technique for slowing down or avoiding the post-production colour change in isocyanate-based foams such as polyurethane foams produced from formulations containing aromatic-based isocyanates.

Accordingly, there remains a need in the art an isocyanate-based polymer foam, particularly such foams produced from formulations containing aromatic-based isocyanates having improved anti-yellowing properties. Ideally, such a foam could be produced without the need to alter foam moulding equipment and other chemical components in the formulation used to produce the foam. Thus, it would be highly desirable to be able to produce such a foam by the addition to the formulation of a relatively low cost additive have no significant deleterious effect on the resultant foam

SUMMARY OF THE INVENTION

It is an object of the present invention to obviate or mitigate at least one of the above-mentioned disadvantages of the prior art.

Accordingly, in one of its aspects, the present invention provides an isocyanate-based polymer foam produced from a formulation comprising an isocyanate, a blowing agent, a first active hydrogen-containing compound and a second active hydrogen-containing compound different than the first active hydrogen-containing compound, the second active hydrogen-containing compound comprising an active hydrogen-containing phosphite compound.

A molded isocyanate-based polymer foam produced from a formulation comprising an isocyanate, a blowing agent, a first active hydrogen-containing compound and a second active hydrogen-containing compound different than the first active hydrogen-containing compound, the second active hydrogen-containing compound comprising an active hydrogen-containing phosphite compound.

An isocyanate-based polymer foam produced from a formulation comprising an isocyanate, a blowing agent, a first active hydrogen-containing compound and a second active hydrogen-containing compound different than the first active hydrogen-containing compound, the second active hydrogen-containing compound comprising an active hydrogen-containing phosphite compound, with the proviso that the active hydrogen-containing phosphite compound is not present in any amount of 2 percent by weight of the foam.

In another of its aspects, the present invention provides a process for producing a foamed isocyanate-based polymer comprising the steps of:

contacting an isocyanate, a blowing agent, a first active hydrogen-containing compound and a second active hydrogen-containing compound different than the first active hydrogen-containing compound to form a reaction mixture; and expanding the reaction mixture to produce the foamed isocyanate-based polymer wherein the second active hydrogen-containing compound comprises an active hydrogen-containing phosphite compound.

Thus, the present inventors have surprisingly and unexpectedly discovered that incorporation of an active hydrogen-containing phosphite compound in an otherwise general formulation for production of an isocyanate-based polymeric foam results in a foam have significantly improved anti-yellowing properties. In addition, incorporation of such an active hydrogen-containing phosphite compound can, in many cases, confer flame retardant and/or load building properties to the foam. In preferred embodiments of the invention, incorporation of the active hydrogen-containing phosphite compound confers to the resultant foam improved anti-yellowing properties, improved flame retardant properties and improved load building (or firmness) properties. In many cases, the allows for elimination of formulation compounds added specific to confer flame retardant properties and displacement of a significant amount of load building ingredients such as copolymer polyols. Without wishing to be bound by any particular theory or mode of action it is believed that the active hydrogen-containing phosphite compound used to produce the present isocyanate-based foam reacts with the isocyanate component of the formulation. It is believed that this interaction is responsible, at least in part, for load building and flame retardant properties which conferred to the foam in addition to the improved anti-yellowing properties.

BRIEF DESCRIPTION OF THE DRAWINGS

Embodiments of the present invention will be described with reference to the accompanying drawings, wherein like reference numerals denote like parts, and in which:

FIGS. 1 and 2 illustrate graphically the resistance to yellowing in respect of a number foams produced in the Examples below.

DETAILED DESCRIPTION OF THE PREFERRED EMBODIMENTS

Figure 1:
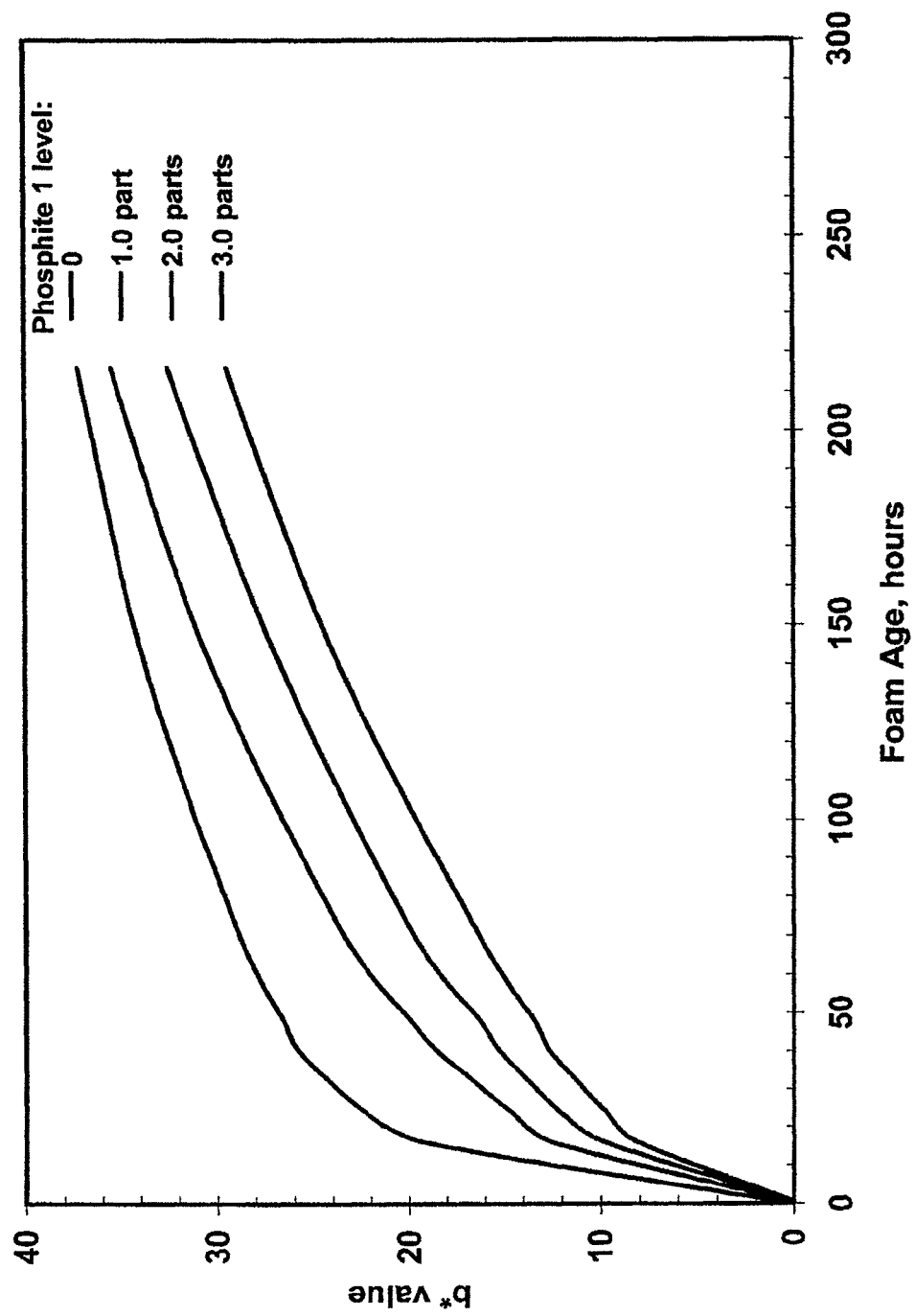

The present invention is related to a foamed isocyanate-based polymer and to a process for production thereof. Preferably, the isocyanate-based polymer is selected from the group comprising polyurethane, polyurea, urea-modified polyurethane, urethane-modified polyurea and isocyanurate-modified polyurethane. As is known in the art, the term "modified", when used in conjunction with a polyurethane or polyurea means that up to 50% of the polymer backbone forming linkages have been substituted.

The present foamed isocyanate-based polymer preferably is produced from a reaction mixture which comprises an isocyanate, a first active hydrogen-containing compound and a second active hydrogen-containing compound which is different than the first active hydrogen containing compound.

The selection of an isocyanate suitable for use in the reaction mixture is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, toluene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A particularly preferred class of isocyanates useful in the present isocyanate-based polymer foam is the so-called aromatic-based isocyanates (e.g., those isocyanates based on diphenylmethane diisocyanate and/or toluene diisocyanate).

A more preferred isocyanate is a mixture comprising (i) a prepolymer of 4,4'-diphenylmethane diisocyanate and (ii) a carbodiamide-derivative based on 4,4'-diphenylmethane diisocyanate. Preferably the mixture comprises a weight ratio of (i):(ii) in the range of from about 1:1 to about 9:1.

Another more preferred isocyanate is selected from the group comprising 2,4'-diphenylmethane diisocyanate, 4,4'-diphenylmethane diisocyanate, modified 4,4'-diphenylmethane diisocyanate (modified to liquefy the diisocyanate at ambient temperature) and mixtures thereof.

The most preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate.

Preferably, the isocyanate used in the present process has a functionality in the range of from about 2.0 to about 2.7, more preferably in the range of from about 2.0 to about 2.3.

The isocyanate preferably is used in an amount to provide an isocyanate index, inclusive of all reactive equivalents in the reaction mixture, in the range of from about 60 to about 120, more preferably from about 70 to about 115, most preferably from about 85 to about 115.

If the process is utilized to produce a polyurethane foam, the active hydrogen-containing compound is typically a polyol.

The choice of polyol suitable for use herein is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols.

A preferred polyol comprises polyether polyols. Preferably, such a polyether polyol has a molecular weight in the range of from about 200 to about 10,000, more preferably from about 2,000 to about 8,000, most preferably from about 4,000 to about 7,000.

Further, it is possible to utilize a prepolymer technique to produce a polyurethane foam within the scope of the present invention. In one embodiment, it is contemplated that the prepolymer be prepared by reacting an excess of isocyanate with a polyol (as discussed above). The prepolymer could then be reacted with further polyol (the same or different than the first polyol) to produce a polyurethane foam or an amine to produce a polyurea-modified polyurethane.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

In another embodiment, the first polyol may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using unmodified polyols. Non-limiting examples of useful polymer polyols include: chain-growth copolymer polyols (e.g., containing particulate poly(acrylonitrile), poly(styrene-acrylonitrile) and mixtures thereof), and/or step-growth copolymer polyols (e.g., PolyHarnstoff Dispersions (PHD), polyisocyanate polyaddition (PIPA) polyols, epoxy dispersion polyols and mixtures thereof). For further information on polymer polyols, see, for example, Chapter 2 of FLEXIBLE FOAM FUNDAMENTALS, Herrington et al. (1991) and the references cited therein. If a polymer polyol is used, it is preferred to admix the polymer polyol with a base polyol. Generally, mixtures may be used which contain polymer polyol in an amount in the range of from about 5 to about 50 percent by weight of unmodified polyol present in the mixture.

The second active hydrogen-containing compound comprises an active hydrogen-containing phosphite compound.

In one preferred embodiment, the second active hydrogen-containing compound is reactive with at least one other component of the formulation.

Preferably, the active hydrogen-containing phosphite compound comprises one or more of the following moieties: hydroxyl, amino, carboxy, thiol and amido. More preferably, the active hydrogen-containing phosphite compound comprises one more hydroxyl groups.

In a more preferred embodiment, the active hydrogen-containing phosphite compound has the following formula

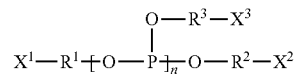

wherein:

$R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;

$X^2$ and $X^3$ may be the same or different and each is selected from the group comprising hydroxyl, amino, carboxy, thiol and amido; and n is an integer in the range of from 1 to 10.

In one preferred embodiment, $R^1$, $R^2$ and $R^3$ are the same. In another preferred embodiment, $R^1$, $R^2$ and $R^3$ are different.

In one preferred embodiment, $X^1$, $X^2$ and $X^3$ are the same. In another preferred embodiment, $X^1$, $X^2$ and $X^3$ are different.

In one preferred embodiment, n is 1 or 3.

In a more preferred embodiment, $R^1$, $R^2$ and $R^3$ are the same, $X^1$, $X^2$ and $X^3$ are the same and n is 1 or 3.

Specifically examples of compounds useful as the second active hydrogen-containing compound comprise tris(dipropyleneglycol)phosphite, heptakis(dipropyleneglycol)trisphosphite and mixtures thereof. Most preferably, the second active hydrogen-containing compound comprises tris(dipropyleneglycol)phosphite.

Preferably, the second active hydrogen-containing compound is present in the formulation in an amount in the range from of about 0.1 to about 20, more preferably from about 0.5 to about 10, most preferably from about 0.5 to about 3.0, parts by weight per 100 parts by weight of the first active hydrogen-containing compound.

The reaction mixture used to produce the present foamed isocyanate-based polymer typically will further comprise a blowing agent. As is known in the art water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 10 or more parts by weight, preferably from about 1.0 to about 3.0 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

The reaction mixture used to produce the present foamed isocyanate-based polymer typically will further comprise a catalyst. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. It is also possible to utilize the so-called delayed action catalysts. Of course it will be understood by those skilled in the art that a combination of two or more catalysts may be suitably used.

As will be clearly understood by those of skill in the art, it is contemplated that conventional additives in the polyurethane foam art can be used in the present process. Non-limiting examples of such additives include: filler materials, surfactants, cell openers (e.g., silicone oils), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), antioxidants, UV stabilizers (e.g., hydroxybenzotriazoles, zinc dibutyl thiocarbamate, 2,6-ditertiary butylcatechol, hydroxybenzophenones, hindered amines and mixtures thereof), biocides, antistatic agents (e.g., ionizable metal salts, carboxylic acid salts, phosphate esters and mixtures thereof) and mixtures thereof. The amounts of these additives conventionally used is within the purview of a person skilled in the art—see, for example, Chapter 2 of FLEXIBLE FOAM FUNDAMENTALS, Herrington et al. (1991) and the references cited therein.

The manner by which the isocyanate, first active hydrogen-containing compound, second hydrogen-containing compound, blowing agent, catalyst and other additives (if present) are contacted in the present process is not particularly restricted. Thus, it is possible to preblend the components in a separate tank which is then connected to a suitable mixing device for mixing with the blowing agent and catalyst. Alternatively, it is possible to preblend the active hydrogen-containing compound (e.g., polyol) with the blowing agent, catalyst, the second active hydrogen-containing compound and other additives, if present, to form a resin. This resin preblend could then be fed to a suitable mixhead (high pressure or low pressure) which would also receive an independent stream of the isocyanate. The plasticizer may be fed as a separate stream to the mixhead or into the resin stream via a suitable manifold or the like prior to the mixhead.

Once the first and second active hydrogen-containing compounds, isocyanate, blowing agent, catalyst and other additives (if present) have been contacted and, ideally, mixed uniformly, a reaction mixture is formed. This reaction mixture is then expanded to produce the present isocyanate-based polyurethane foam. As will be apparent to those of skill in the art, the process of the present invention is useful in the production of slabstock foam, molded articles and the like. The manner by which expansion of the reaction mixture is effected will be dictated by the type of foam being produced.

Embodiments of the present invention will now be described with reference to the following Examples which should not be construed as limiting the scope of the invention. The term "pbw" used in the Examples refers to parts by weight.

In the Examples, the following materials were used:

E837, base polyol, commercially available from Lyondell;

E850, a 43% solids content copolymer (SAN) polyol, commercially available from Bayer;

Phosphite #1, tris(dipropyleneglycol)phosphite;

Lupranate T80, isocyanate (TDI), commercially available from BASF;

MDI, isocyanate (MDI) commercially available from Dow;

TM20, an 80/20 weight ratio blend of T80 and MDI;

DC-5043, a surfactant, commercially available from Air Products;

PC77, a catalyst, commercially available from Air Products;

Glycerine, a cross-linking agent, commercially available from Van Waters & Rogers;

DEOA-LF, diethanolamine, a cross-linking agent commercially available from Air Products;

Water, an indirect blowing agent;

Dabco™ 33LV, a gelation catalyst, commercially available from Air Products;

FR-W, a flame retardant, commercially available from Akzo Chemicals;

AB100, a flame retardant, commercially available from Albright & Wilson; and

A-1, a blowing catalyst, commercially available from Witco.

EXAMPLES 1-3

A number of molded foams were produced using formulations based on the amounts of E837, E850, Phosphite #1 and T80 set out in Table 1. The formulations also contained DC-5043, glycerine, DEOA-LF, water, 33-LV and A-1 in conventional amounts. As will be apparent, the formulations of Control A, Control B and Control C contained no phosphite additive. Accordingly, foams produced from the formulations of Control A, Control B and Control C are outside the scope of the present invention and are provided for comparative purposes only. It should be noted that the formulations of Control A, Control B and Control C each contained FR-W in a conventional amount whereas FR-W, a conventional flame retardant additive, was not used in the Formulations of Examples 1-3. As is further apparent, the formulations of Examples 1-3 each comprised an active (or reactive) phosphite additive. Accordingly, foams produced from the formulations of Examples 1-3 are within the scope of the present invention. Further, in the formulations of Examples 1-3 the phosphite additive was present in an amount which displaced copolymer polyol in the formulation of Control A in the a ratio of approximately 1:2—e.g., in the formulation of Example 1, 2.7 parts by weight of phosphite additive displaces 5.4 parts by weight copolymer polyol in the formulation of Control A.

The resultant foams were then subjected to physical testing.

Specifically, the Indentation Force Deflection (IFD) at 50% compression of each foam was determined using ASTM D-3574-B1. The results are provided in Table 1. As can be seen, the foam produced in Example 1 had an IFD at 50% compression which is approximately the same as that of the foam produced in Control A notwithstanding the fact the formulation from which the foam of Example 1 was produced contained approximately 10% less copolymer polyol when compared to the formulation from which the foam of Control A was produced. Further, as can be seen, the foam produced in Example 2 had an IFD at 50% compression which is approximately the same as that of the foam produced in Control B notwithstanding the fact the formulation from which the foam of Example 2 was produced contained approximately 15% less copolymer polyol when compared to the formulation from which the foam of Control B was produced. Still further, as can be seen, the foam produced in Example 3 had an IFD at 50% compression which is approximately the same as that of the foam produced in Control C notwithstanding the fact the formulation from which the foam of Example 3 was produced contained approximately 12% less copolymer polyol when compared to the formulation from which the foam of Control B was produced.

The foams were also subject to flammability testing pursuant to FMVSS302. All foams were found to be self-extinguishing. This was expected for the foams produced from the formulations of Control A, Control B and Control C since these contained a sufficient amount of a conventional flame retardant additive (i.e., FR-W). Surprisingly and unexpectedly, the foams produced from the formulations of Examples 1-3 were found to be self-extinguishing even though the starting formulations contained no conventional flame retardant additive.

Accordingly, these Examples illustrate that the phosphite additive may be used to: (i) displace significant amounts (e.g., 12% and 15%) of copolymer polyol in the starting formulation without appreciable loss of firmness of the resultant foam, and (ii) eliminate the need to add a conventional flame retardant additive to the starting formulation for the foam to pass flammability tests.

EXAMPLES 4-6

A number of molded foams were produced using formulations based on the amounts of E837, E850, Phosphite #1 and T80 set out in Table 2. The formulations also contained DC-5043, glycerine, DEOA-LF, water, 33-LV, A-1 and AB100 in conventional amounts. As will be apparent, the formulation of Control D contained no phosphite additive. Accordingly, foam produced from the formulation of Control D is outside the scope of the present invention and is provided for comparative purposes only. In contrast, the formulations of Examples 4-6 comprised various amounts of a phosphite additive. Accordingly, foams produced from the formulations of Examples 4-6 are within the scope of the present invention.

The resultant foams were then subjected to testing to determine their anti-yellowing properties. The colour testing device used was an X-Rite Spectrophotometer (Model SP62) commercially available from X-Rite Inc. See the article entitled "Inhibition of the Discoloration of Polyurethane Foam Caused by Ultraviolet Light" by Valentine et al. (1992), 34$^{th}$ Annual Polyurethane Technical/Marketing Conference and the references cited therein for further information on the testing method. The results are reported in Table 3 as the Yellow Index b* for each sample and are illustrated in FIG. 1.

As shown, the foams produced from the formulations of Examples 4-6 have increasingly improved anti-yellowing (or whiteness) properties when compared to the foam produced from the formulation of Control D.

EXAMPLE 7

A number of molded foams were produced using formulations based on the amounts of E837, E850, Phosphite #1 and T80 set out in Table 4. The formulations also contained DC-5043, glycerine, DEOA-LF, water, 33-LV and A-1 in conventional amounts. The formulations did not contain any conventional flame retardant additive. As will be apparent, the formulation of Control E contained no phosphite additive. Accordingly, foam produced from the formulation of Control E is outside the scope of the present invention and is provided for comparative purposes only. In contrast, the formulation of Example 7 comprised 3 parts by weight of a phosphite additive. Accordingly, foam produced from the formulation of Examples 7 is within the scope of the present invention.

The resultant foams where subject to the same physical testing as reported above for Examples 1-3. The results are provided in Table 4. As can be seen, the foam produced in Example 7 had an IFD at 50% compression which is approximately 10% greater than that of the foam produced in Control E notwithstanding the fact the formulation from which the foam of Example 1 was produced contained approximately 6% less copolymer polyol when compared to the formulation from which the foam of Control E was produced.

The foams were also subject to flammability testing pursuant to FMVSS302. The foam produced from the formulation of Example 7 passed the test and was self-extinguishing whereas the foam produced from the formulation of Control E was not self-extinguishing.

Further, the foam produced from the formulation of Example 7 had these improved properties with no appreciable loss of valuable foam properties or characteristics.

EXAMPLES 8-13

A number of molded foams were produced using formulations based on the amounts of E837, E850, Phosphite #1, T80, TM20 and MDI set out in Table 2. The formulations also contained DC-5043, glycerine, DEOA-LF, water, 33-LV, A-1 and AB 100 (or equivalents) in conventional amounts. As will be apparent, the formulations of Control F, Control G, and Control H contained no phosphite additive. Accordingly, foams produced from the formulation of Control F, Control G and Control H are outside the scope of the present invention and are provided for comparative purposes only. In contrast, the formulations of Examples 8-13 comprised various amounts of a phosphite additive. Accordingly, foams produced from the formulations of Examples 8-13 are within the scope of the present invention.

The resultant foams were then subjected to testing to determine their anti-yellowing properties as described above for the foams of Examples 4-6. The period of aging was 72 hours after production with storage under constant fluorescent lights and ambient temperature and humidity.

As shown, the foams produced from the formulations of Examples 8 and 9 have increasingly improved anti-yellowing (or whiteness) properties when compared to the foam produced from the formulation of Control F. Further, the foams produced from the formulations of Examples 10 and 11 have increasingly improved anti-yellowing (or whiteness) properties when compared to the foam produced from the formulation of Control G. Still further, the foams produced from the formulations of Examples 12 and 13 have increasingly improved anti-yellowing (or whiteness) properties when compared to the foam produced from the formulation of Control H.

TABLE 1

| Ingredient | Control A | 1 | Control B | 2 | Control C | 3 |
|---|---|---|---|---|---|---|
| E850 | 36.6 | 31.2 | 35.7 | 30.2 | 46.7 | 41.0 |
| E837 | 63.4 | 66.1 | 64.3 | 67.0 | 53.3 | 56.3 |
| Phosphite#1 | 0.0 | 2.7 | 0.0 | 2.7 | 0.0 | 2.7 |
| T80 (index) | 97 | 97 | 96 | 96 | 96 | 96 |
| 50% IFD (N) | 304 | 306 | 211 | 218 | 253 | 255 |

TABLE 2

| | Example | | | |
|---|---|---|---|---|
| Ingredient | Control D | 4 | 5 | 6 |
| E850 | 50.00 | 49.00 | 48.00 | 47.00 |
| E837 | 50.00 | 50.00 | 50.00 | 50.00 |
| Phosphite#1 | 0.00 | 1.00 | 2.00 | 3.00 |
| T80 (index) | 100 | 100 | 100 | 100 |

TABLE 3

| | Yellow Index b* | | | |
|---|---|---|---|---|
| | | Example | | |
| Foam age (hr) | Control D | 4 | 5 | 6 |
| 0.5 | 0.8 | 0.2 | 0.0 | 0.0 |
| 16 | 19.2 | 12.5 | 9.8 | 8.1 |
| 24 | 22.3 | 14.6 | 12.1 | 9.7 |
| 40 | 25.8 | 18.5 | 15.2 | 12.6 |
| 48 | 26.6 | 19.9 | 16.3 | 13.4 |
| 72 | 29.0 | 23.7 | 20.0 | 16.5 |
| 144 | 34.0 | 30.7 | 27.1 | 24.0 |
| 216 | 37.2 | 35.5 | 32.6 | 29.5 |

TABLE 4

| | Example | |
|---|---|---|
| Ingredient | Control E | 7 |
| E850 | 50.00 | 47.00 |
| E837 | 50.00 | 50.00 |
| Phosphite#1 | 0.00 | 3.00 |
| T80 (index) | 100 | 100 |
| 50% IFD (N) | 287.5 | 303.6 |

TABLE 5

| | Example | |
|---|---|---|
| Ingredient | Control F | 8 | 9 |
| E850 | 50.00 | 50.00 | 50.00 |
| E837 | 50.00 | 50.00 | 50.00 |
| Phosphite#1 | 0.00 | 0.50 | 3.00 |
| Isocyanate/Index | TDI/47.30 | TDI/47.30 | TDI/47.30 |
| b* Value | 36.12 | 34.05 | 21.99 |

TABLE 6

| | Example | |
|---|---|---|
| Ingredient | Control G | 10 | 11 |
| E850 | 50.00 | 50.00 | 50.00 |
| E837 | 50.00 | 50.00 | 50.00 |
| Phosphite#1 | 0.00 | 0.50 | 3.00 |
| Isocyanate/Index | TM20/47.30 | TM20/47.30 | TM20/47.30 |
| b* Value | 39.57 | 35.21 | 23.94 |

TABLE 7

| | Example | |
|---|---|---|
| Ingredient | Control H | 12 | 13 |
| E850 | 3.00 | 3.00 | 3.00 |
| E837 | 73.20 | 73.20 | 73.20 |
| Phosphite#1 | 0.0 | 0.5 | 3.0 |
| Isocyanate/Amount | MDI/87.45 | MDI/87.45 | MDI/87.45 |
| b* Value | 17.09 | 13.95 | 9.81 |

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to use the active hydrogen-containing phosphite compound as is in the formulation or to incorporate its functionality into the other active hydrogen-containing compound (i.e., the polyol or polyoxyalkylene if a polyurethane foam is being produced). Thus, as an example, the active hydrogen-containing phosphite compound could be used as a starter or initiator compound in the production of the polyol thereby avoiding the need to use a conventional polyol and the active hydrogen-containing phosphite compound as separate ingredients in the formulation used to produce the foam. The resulting "phosphite-derivatized" active hydrogen-containing compound (e.g., polyol) could be used as is in the formulation or in the form of an NCO-terminated prepolymer or an active hydrogen-terminated prepolymer (prepolymers are generally discussed above). It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A flexible isocyanate-based polymer foam produced from a formulation comprising:
    an isocyanate;
    a blowing agent consisting essentially of water;
    a first active hydrogen-containing compound; and
    a second active hydrogen-containing compound different than the first active hydrogen-containing compound and excluding tris(dipropyleneglycol) phosphite, the second active hydrogen-containing compound consisting essentially of an anti-yellowing amount of an active hydrogen-containing phosphite compound having the following formula

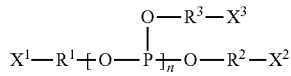

wherein:
        $R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;
        $X^1$, $X^2$ and $X^3$ may be the same or different and each is selected from the group comprising hydroxyl, amino, carboxy, thiol and amido; and
        n is an integer in the range of from 1 to 10, and wherein the second active hydrogen-containing compound is present in the formulation in an amount in the range from of about 0.5 to about 3.0 parts by weight per 100 parts by weight of the first active hydrogen-containing compound, wherein, for a period of 48 hours after production, the foam has a B* value of up to about 90 percent of the B* value of a control foam produced from a control formulation identical to the formulation with the proviso that the control formulation is free of the second active hydrogen-containing compound.

2. The foam defined in claim 1, wherein the second active hydrogen-containing compound is reactive with at least one other component of the formulation.

3. The foam defined in claim 1, wherein active hydrogen-containing phosphite compound comprises one or more of the following moieties:
    hydroxyl, amino, carboxy, thiol and amido.

4. The foam defined in claim 1, wherein the active hydrogen-containing phosphite compound comprises one more hydroxyl groups.

5. The foam defined in claim 1, wherein $R^1$, $R^2$ and $R^3$ are the same.

6. The foam defined in claim 1, wherein $R^1$, $R^2$ and $R^3$ are different.

7. The foam defined in claim 1, wherein $X^1$, $X^2$ and $X^3$ are the same.

8. The foam defined in claim 1, wherein $X^1$, $X^2$ and $X^3$ are different.

9. The foam defined in claim 1, wherein: $R^1$, $R^2$ and $R^3$ are the same, and $X^1$, $X^2$ and $X^3$ are the same.

10. The foam defined in claim 1, wherein the first active hydrogen-containing compound comprises a polyol.

11. The foam defined in claim 1, wherein the isocyanate is selected from the group comprising 2,4-toluene diisocyanate, 2,6-toluene diisocyanate and mixtures thereof.

12. The foam defined in claim 1, wherein the isocyanate is selected from the group consisting essentially of (i) 2,4'-diphenylmethane diisocyanate, 4,4'-diphenylmethane diisocyanate and mixtures thereof and (ii) mixtures of (i) with an isocyanate selected from the group comprising 2,4-toluene diisocyanate, 2,6-toluene diisocyanate and mixtures thereof.

13. The foam defined in claim 1, wherein the water is used in an amount in the range of from about 1.0 to about 10 parts by weight per 100 parts by weight of active hydrogen-containing compound used in the reaction mixture.

14. A process for producing a flexible foamed isocyanate-based polymer comprising the steps of:
    contacting (i) an isocyanate, (ii) a blowing agent consisting essentially of water, (iii) a first active hydrogen-containing compound, (iv) a second active hydrogen-containing compound different than the first active hydrogen-containing compound and excluding tris(dipropyleneglycol) phosphite, and (v) a blowing agent to form a reaction mixture; and
    expanding the reaction mixture to produce the flexible foamed isocyanate-based polymer;
    wherein the second active hydrogen-containing compound consists essentially of an anti-yellowing amount of an active hydrogen-containing phosphite compound having the following formula

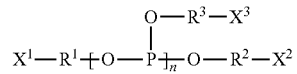

wherein:
        $R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;
        $X^1$, $X^2$ and $X^3$ may be the same or different and each is selected from the group comprising hydroxyl, amino, carboxy, thiol and amido; and
        n is an integer in the range of from 1 to 10, and wherein the second active hydrogen-containing compound is present in the reaction in an amount in the range from of about 0.5 to about 3.0 parts by weight per 100 parts by weight of the first active hydrogen-containing compound, wherein, for a period of 48 hours after production, the foam has a B* value of up to about 90 percent of the B* value of a control foam produced from a control formulation identical to the formulation with the proviso that the control formulation is free of the second active hydrogen-containing compound.

15. The process defined in claim 14, wherein the second active hydrogen-containing compound is reactive with at least one other component of the formulation.

16. The process defined in claim 14, wherein active hydrogen-containing phosphite compound comprises one or more of the following moieties: hydroxyl, amino, carboxy, thiol and amido.

17. The process defined in claim 14, wherein the active hydrogen-containing phosphite compound comprises one more hydroxyl groups.

18. The process defined in claim 14, wherein $R^1$, $R^2$ and $R^3$ are the same.

19. The process defined in claim 14, wherein $R^1$, $R^2$ and $R^3$ are different.

20. The process defined in claim 14, wherein $X^1$, $X^2$ and $X^3$ are the same.

21. The process defined in claim 14, wherein $X^1$, $X^2$ and $X^3$ are different.

22. The process defined in claim 14, wherein: $R^1$, $R^2$ and $R^3$ are the same, and $X^1$, $X^2$ and $X^3$ are the same.

23. The process defined in claim 14, wherein the first active hydrogen-containing compound comprises a polyol.

24. The process defined in claim 14, wherein the isocyanate is selected from the group comprising 2,4-toluene diisocyanate, 2,6-toluene diisocyanate and mixtures thereof.

25. The process defined in claim 14, wherein the isocyanate is selected from the group consisting essentially of (i) 2,4'-diphenylmethane diisocyanate, 4,4'-diphenylmethane diisocyanate and mixtures thereof and (ii) mixtures of (i) with an isocyanate selected from the group comprising 2,4-toluene diisocyanate, 2,6-toluene diisocyanate and mixtures thereof.

26. The process defined in claim 14, wherein the water is used in an amount in the range of from about 1.0 to about 10 parts by weight per 100 parts by weight of active hydrogen-containing compound used in the reaction mixture.

27. A flexible isocyanate-based polymer foam produced from a formulation comprising:
an isocyanate;
a blowing agent consisting essentially of water;
a first active hydrogen-containing compound; and
a second active hydrogen-containing compound different than the first active hydrogen-containing compound and excluding tris(dipropyleneglycol) phosphite, the second active hydrogen-containing compound consisting essentially of an anti-yellowing amount of an active hydrogen-containing phosphite compound having the following formula

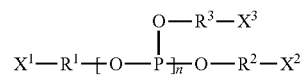

wherein:
$R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;
$X^1$, $X^2$ and $X^3$ may be the same or different and each is selected from the group comprising hydroxyl, amino, carboxy, thiol and amido; and
n is an integer in the range of from 1 to 10, with the proviso that the active hydrogen-containing phosphite compound is not present in an amount of 2 percent by weight of the foam, and wherein the second active hydrogen-containing compound is present in the reaction in an amount in the range from of about 0.5 to about 3.0 parts by weight per 100 parts by weight of the first active hydrogen-containing compound, and wherein, for a period of 48 hours after production, the foam has a B* value of up to about 90 percent of the B* value of a control foam produced from a control formulation identical to the formulation with the proviso that the control formulation is free of the second active hydrogen-containing compound.

28. A flexible isocyanate-based polymer foam produced from a formulation comprising:
isocyanate;
a blowing agent consisting essentially of water;
a first active hydrogen-containing compound; and
a second active hydrogen-containing compound different than the first active hydrogen-containing compound and excluding tris(dipropyleneglycol) phosphite, the second active hydrogen-containing compound consisting essentially of an anti-yellowing amount of an active hydrogen-containing phosphite compound having the following formula

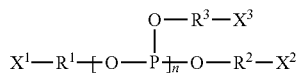

wherein:
$R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;
$X^1$, $X^2$ and $X^3$ may be the same or different and each is selected from the group comprising hydroxyl, amino, carboxy, thiol and amido; and
n is an integer in the range of from 1 to 10, wherein, for a period of 48 hours after production, the foam has a B* value of up to about 85 percent of the B* value of a control foam produced from a control formulation identical to the formulation with the proviso that the control formulation is free of the second active hydrogen-containing compound, and wherein the second active hydrogen-containing compound is present in the reaction in an amount in the range from of about 0.5 to about 3.0 parts by weight per 100 parts by weight of the first active hydrogen-containing compound.

29. A flexible isocyanate-based polymer foam produced from a formulation comprising:
isocyanate;
a blowing agent consisting essentially of water;
a first active hydrogen-containing compound; and
a second active hydrogen-containing compound different than the first active hydrogen-containing compound and excluding tris(dipropyleneglycol) phosphite, the second active hydrogen-containing compound consisting essentially of an anti-yellowing amount of an active hydrogen-containing phosphite compound having the following formula

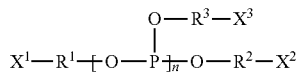

wherein:
- $R^1$, $R^2$ and $R^3$ may be the same or different and each is selected from the group comprising a $C_1$-$C_{40}$ aliphatic group optionally containing one or more heteroatoms, $C_5$-$C_{40}$ aromatic group optionally containing one or more heteroatoms and a $C_5$-$C_{50}$ araliphatic group optionally containing one or more heteroatoms;
- $X^1$, $X^2$ and $X^3$ may be the same or different and each is selected from the group comprising hydroxyl, amino, carboxy, thiol and amido; and
- n is an integer in the range of from 1 to 10, wherein, for a period of 48 hours after production, the foam has a B* value of up to about 80 percent of the B* value of a control foam produced from a control formulation identical to the formulation with the proviso that the control formulation is free of the second active hydrogen-containing compound, and wherein the second active hydrogen-containing compound is present in the reaction in an amount in the range from of about 0.5 to about 3.0 parts by weight per 100 parts by weight of the first active hydrogen-containing compound.

* * * * *